(12) United States Patent
Onishi et al.

(10) Patent No.: US 9,438,892 B2
(45) Date of Patent: Sep. 6, 2016

(54) VIDEO DISPLAY DEVICE

(71) Applicant: Panasonic Corporation, Kadoma-shi, Osaka (JP)

(72) Inventors: Toshiki Onishi, Osaka (JP); Kazuhito Kimura, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 777 days.

(21) Appl. No.: 13/855,350

(22) Filed: Apr. 2, 2013

(65) Prior Publication Data

US 2013/0215241 A1    Aug. 22, 2013

Related U.S. Application Data

(63) Continuation of application No. PCT/JP2011/005532, filed on Sep. 30, 2011.

(30) Foreign Application Priority Data

Oct. 4, 2010   (JP) .................................. 2010-224986

(51) Int. Cl.
| | |
|---|---|
| H04N 13/04 | (2006.01) |
| G09G 3/20 | (2006.01) |
| G09G 3/34 | (2006.01) |
| G09G 3/00 | (2006.01) |

(52) U.S. Cl.
CPC ............ *H04N 13/0402* (2013.01); *G09G 3/20* (2013.01); *G09G 3/3406* (2013.01); *H04N 13/0497* (2013.01); *G09G 3/003* (2013.01)

(58) Field of Classification Search
CPC ...................... H04N 13/0402; H04N 13/0497; G09G 3/20; G09G 3/003; G09G 3/3406
See application file for complete search history.

(56) References Cited

U.S. PATENT DOCUMENTS

| | | | | |
|---|---|---|---|---|
| 5,982,417 | A | * 11/1999 | Blonde .................... | G06T 15/00 348/43 |
| 6,160,527 | A | * 12/2000 | Morishima ........ | G02B 27/2214 345/32 |
| 2009/0196573 | A1 | * 8/2009 | Kurita .................... | H04N 5/775 386/278 |
| 2010/0019993 | A1 | * 1/2010 | Chui .......................... | G09F 9/33 345/31 |
| 2010/0045784 | A1 | * 2/2010 | Okazaki ............. | H04N 13/0029 348/55 |

(Continued)

FOREIGN PATENT DOCUMENTS

| | | |
|---|---|---|
| JP | 2001-142409 | 5/2001 |
| JP | 2009-181075 | 8/2009 |

(Continued)

*Primary Examiner* — Tat Chio
(74) *Attorney, Agent, or Firm* — Hamre, Schumann, Mueller & Larson, P.C.

(57) ABSTRACT

A video display device is provided to achieve local control for a high-quality 3D image while reducing extraneous radiation. A video display device that receives video signals from two video signal lines with an identical frame period and is capable of displaying a stereoscopic image based on left-eye and right-eye images, the video display device including: a liquid crystal drive unit; a liquid crystal panel; an LED backlight that has a plurality of light emission areas; a combination unit that generates a composite video signal by combining the video signals with the identical frame period; a local control unit that detects a video feature quantity such as the intensity value of the composite video signal and determines the light-emission intensity value of the light emission area; and an LED driver.

17 Claims, 15 Drawing Sheets

(56) References Cited

U.S. PATENT DOCUMENTS

| | | |
|---|---|---|
| 2010/0085477 A1 | 4/2010 | Ooishi et al. |
| 2011/0050748 A1 | 3/2011 | Tsuchiya et al. |
| 2011/0050861 A1 | 3/2011 | Sakamoto et al. |
| 2011/0221788 A1 | 9/2011 | Asano et al. |
| 2011/0234777 A1 | 9/2011 | Kobayashi et al. |
| 2011/0292309 A1* | 12/2011 | Lin .................. G02B 27/2264 349/15 |
| 2012/0033042 A1 | 2/2012 | Mori et al. |

FOREIGN PATENT DOCUMENTS

| | | |
|---|---|---|
| JP | 2010-85946 | 4/2010 |
| JP | 2011-48281 | 3/2011 |
| JP | 2011-053373 | 3/2011 |
| JP | 2011-186224 | 9/2011 |
| WO | WO 2010/143559 | 12/2010 |
| WO | WO 2011/052236 | 9/2011 |

\* cited by examiner

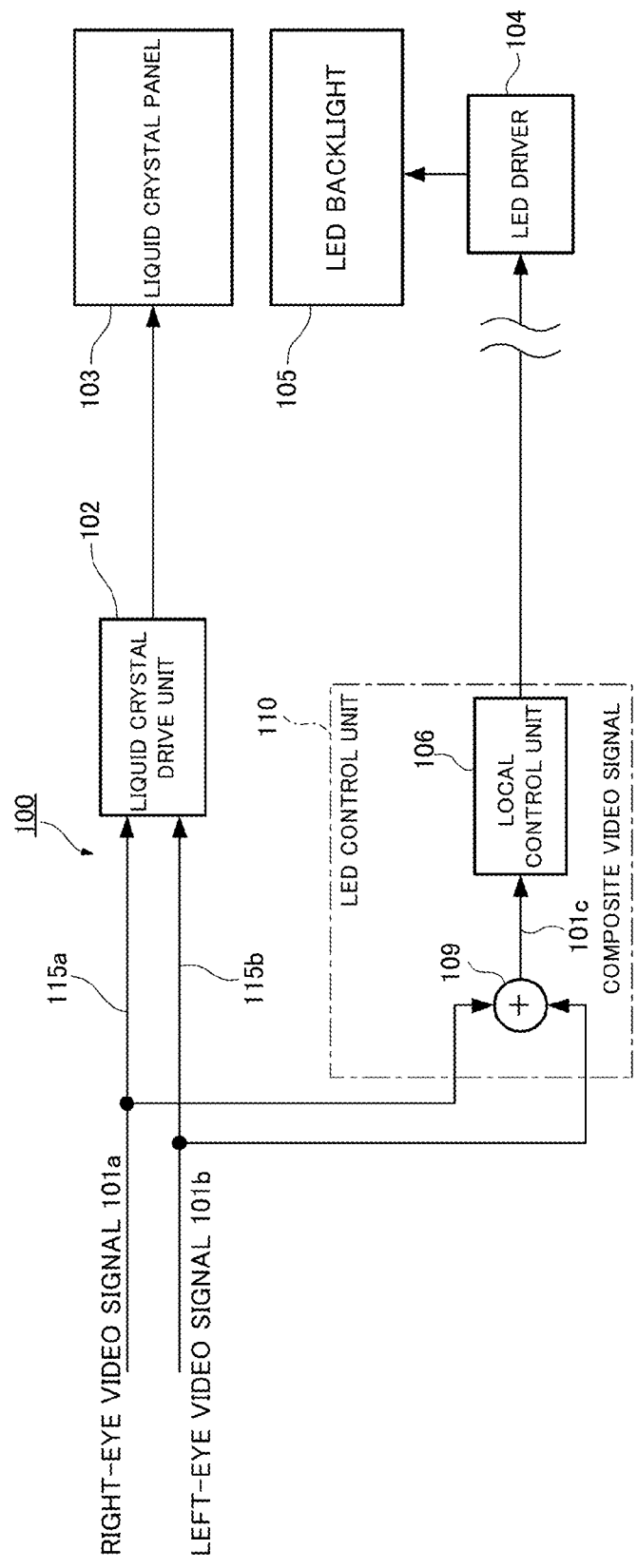

VIDEO DISPLAY DEVICE

FIELD OF THE INVENTION

The present invention relates to a video display device.

BACKGROUND OF THE INVENTION

A liquid crystal display device acting as a video display device illuminates a liquid crystal panel with an LED backlight including an array of light-emitting diodes (LEDs).

For such a video display device, a technique called "local contrast control" is particularly known (e.g., Japanese Patent Laid-Open No. 2001-142409). In this technique, LEDs are two-dimensionally arranged directly under a liquid crystal panel and the brightness of the LED is controlled according to the feature quantity of a video signal, mainly an intensity value. Such local contrast control can improve the contrast of a displayed image.

In recent years, video display devices with a 3D (three-dimensional) display function (hereinafter, will be called 3D-TVs) have been announced one after another. A 3D-TV displays a left-eye image and a right-eye image at the same time or in a time sharing manner, allowing a viewer to recognize a three-dimensional image. The former method will be called an image segmentation system while the latter method will be called a time-sharing system.

In the future, local contrast control is expected to be introduced to 3D-TVs. A feature quantity in the local contrast control needs to be detected for each of a left-eye image and a right-eye image. The intensity of an LED backlight needs to be alternately switched between a left eye and a right eye based on the set intensity value of the LED backlight, particularly in the time-sharing system. The set intensity value is determined according to the feature quantity.

FIG. 14 illustrates a typical configuration of a 3D-TV of the time-sharing system having a local contract control function. FIG. 14 is a block diagram illustrating a liquid crystal display device 1000 that displays full high definition (FHD) images for left and right eyes in a time sharing manner with a frequency of 120 Hz. Shutter glasses in synchronization with the switching of left and right displayed images are worn to enable stereoscopic vision.

As shown in FIG. 14, the video display device 1000 receives FHD video signals of two systems: a right-eye video signal 1001a and a left-eye video signal 1001b. A video signal transmitted in a 3D transmission format of High-Definition Multimedia Interface (HDMI) is outputted after undergoing expansion, I/P (Interlace/Progressive) conversion, and so on in a circuit (not shown) preceding the configuration of FIG. 14. FIG. 15A shows the state of the output. As shown in FIG. 15A, the right-eye video signal 1001a and the left-eye video signal 1001b are in phase (simultaneously inputted) with a frame period of 60 Hz. A liquid crystal drive unit 1002 displays an image on a liquid crystal panel 1003 based on the video signals 1001 (1001a, 1001b). The liquid crystal panel 1003 is illuminated with light from the back by an LED backlight 1005 driven by an LED driver 1004. In this configuration, the video display device 1000 includes two local control units 1006 (right-eye local control unit 1006a and left-eye local control unit 1006b) that determine the light quantity of an LED for illuminating an image according to a feature quantity for each of right and left eyes, and a selector (selecting unit) 1007 that transmits results determined by the local control units 1006, to the LED driver 1004 while switching the results every 120 Hz. As shown in FIG. 15B, a displayed image and an inputted image are provided at different times, and thus the video display device 1000 further includes a delay adjusting memory 1008 that absorbs the difference. Hence, when the liquid crystal panel 1003 displays a right-eye image, the LED backlight 1005 is illuminated according to the feature quantity of the right-eye video signal 1001a in the previous frame. When a left-eye image is displayed, the LED backlight 1005 is illuminated according to the feature quantity of the left-eye video signal 1001b in the previous frame.

In the video display device 1000 of the conventional configuration, however, communications relating to LED light emission intensity are carried out with the LED driver 1004 every 120 Hz. Thus, unfortunately, large extraneous radiation may occur at this point and other electronic components may be adversely affected by noise.

The present invention has been devised in consideration of this point. An object of the present invention is to provide a video display device that can achieve local control for high-quality 3D images while reducing extraneous radiation.

DISCLOSURE OF THE INVENTION

The present invention is a video display device that receives video signals from an even number of video signal lines with an identical frame period and is capable of displaying a stereoscopic image based on left-eye and right-eye images included in the video signals, the video display device including: a video display drive unit that outputs the video signals inputted from the video signal lines; a video display unit that has a plurality of display areas and displays the left-eye image and the right-eye image by modulating light incident from the back of the video display unit in response to the inputted video signals; a light-emitting device that has a plurality of light emission areas for the respective display areas and illuminates the video display unit with light from the back of the video display unit; a light-emitting device drive unit that drives the light-emitting device; and a light-emitting device control unit that determines the light-emission intensity value of the light emission area based on the left-eye image and the right-eye image and controls and operates the light-emitting device drive unit at an operating frequency lower than the operating frequency of the video display unit.

With this configuration, the operating frequency of the light-emitting device drive unit is lower than that of the video display unit, reducing extraneous radiation caused by communications with the light-emitting device drive unit. Moreover, the light-emission intensity value of the light emission area is determined based on the left-eye image and the right-eye image, achieving local control for a high-quality 3D image. Specifically, local control only based on one of the right-eye image and the left-eye image may cause unbalanced intensity when the image for the other viewpoint is displayed. The present embodiment can suppress the occurrence of such a problem.

According to the present invention, the light-emitting device control unit includes: a combination unit that generates a composite video signal by combining the video signals inputted with the identical frame period from the even number of video signal lines; and a local control unit that detects a video feature quantity such as the intensity value of the composite video signal for each of the display areas and determines the light-emission intensity value of the light emission area according to the video feature quantity.

With this configuration, the combination unit combines the video signals to generate the composite video signal and determines the light-emission intensity value of the light emission area according to the video feature quantity of the composite video signal, requiring only a small number of local control units with a small circuit size. The conventional video display device requires local control units for a right eye and a left eye (right-eye local control unit and left-eye local control unit) and a delay adjusting memory. Thus, the circuit size of the video display device increases with higher manufacturing cost and large power is necessary for holding an output. In contrast, the present invention can reduce the number of local control units to, e.g., one with a small circuit size, leading to lower manufacturing cost and lower output holding power.

The video display device is applicable to a so-called time-sharing system in which the video display drive unit alternately outputs the left-eye image and the right-eye image to the video display unit with a frequency equal to even multiples of an input frequency based on the video signals inputted from the video signal lines, or a so-called image segmentation system in which the video display drive unit simultaneously outputs the left-eye image and the right-eye image to the video display unit with a frequency equal to an input frequency or even multiples of the input frequency based on the video signals inputted from the video signal lines.

Furthermore, the left-eye video signal and the right-eye video signal are simultaneously inputted with an identical frame period from the even number of different signal lines, and the combination unit combines the left-eye video signal and the right-eye video signal and outputs the composite video signal to the local control unit.

The combination unit of the present invention outputs the composite video signal to the local control unit from composite video signal output lines as many as a half of the video signal lines with a frequency identical to a frequency for inputting the left-eye video signal and the right-eye video signal.

This configuration can reduce the output frequency of an updating signal for light emission intensity, thereby reducing extraneous radiation caused by communications with the light-emitting device drive unit.

The combination unit may combine the right-eye video signal and the left-eye video signal by averaging the signals. With this configuration, the light-emission intensity value of the light emission area can be relatively simply determined based on the signal having a feature quantity satisfactorily containing intensity information on the intensity of the left-eye image and the intensity of the right-eye image.

The combination unit may compare the intensity of the left-eye image and the intensity of the right-eye image and output the composite signal while correcting the signal to or close to higher intensity. This configuration can minimize the degree of difficulty in viewing an image with lower intensity unlike in the case where the signal is outputted after being averaged in the combination unit.

Moreover, the combination unit may output the composite signal while correcting the signal to or close to higher intensity of the output signal as an intensity difference increases between the intensity of the left-eye image and the intensity of the right-eye image. This configuration can minimize the degree of difficulty in viewing an image with lower intensity unlike in the case where the signal is outputted after being averaged.

Furthermore, different left-right video signals are simultaneously inputted with an identical frame period from different signal lines, the left-right video signal containing alternately inputted left-eye and right-eye video signals, and the combination unit combines the different left-right video signals and alternately outputs a compressed right-eye composite image and a compressed left-eye composite image to the local control unit.

The combination unit of the present invention outputs the composite video signal to the local control unit from composite video signal output lines as many as a half of the video signal lines with a frequency identical to a frequency for inputting the left-right video signal.

This configuration can also reduce the output frequency of an updating signal for light emission intensity, thereby reducing extraneous radiation caused by communications with the light-emitting device drive unit.

Furthermore, the left-eye video signal and the right-eye video signal are inputted from the different video signal lines for an odd-numbered pixel and an even-numbered pixel, and the combination unit selects and outputs only one of the video signal corresponding to an odd-numbered pixel and the video signal corresponding to an even-numbered pixel, thereby generating the composite video signal with quite a simple configuration.

The video display device may further include a time-axis filter on the output stage of the local control unit.

The video display device further includes a memory and a light-emission intensity combination unit on the output stage of the local control unit, the memory storing a light-emission intensity value based on temporally preceding one of the left-eye image and the right-eye image that are outputted from the combination unit, the light-emission intensity combination unit comparing the light-emission intensity value stored in the memory with a light-emission intensity value based on temporally subsequent one of the left-eye image and the right-eye image that are outputted from the combination unit, and outputting a composite signal while correcting the signal to or close to higher intensity.

The video display device further includes a memory and a light-emission intensity combination unit on the output stage of the local control unit, the memory storing a light-emission intensity value based on temporally preceding one of the left-eye image and the right-eye image that are outputted from the combination unit, the light-emission intensity combination unit outputting a composite signal while correcting the signal to or close to higher intensity according to an intensity difference between the light-emission intensity value stored in the memory and a light-emission intensity value based on temporally subsequent one of the left-eye image and the right-eye image that are outputted from the combination unit.

The combination unit of the present invention generates one of a left-eye image and a right-eye image corresponding to the left-eye image by combining the video signals inputted with the identical frame period from the even number of video signal lines, and outputs the generated right-eye image and left-eye image in a temporally independent and sequential manner, the video display device further including a memory for storing temporally preceding one of the left-eye image and the right-eye image that are outputted from the combination unit, and a second combination unit that combines the image stored in the memory and temporally subsequent one of the left-eye image and the right-eye image that are outputted from the combination unit, and outputs the result of combination as a composite video signal to the local control unit.

The second combination unit of the present invention compares the intensity of the image stored in the memory with the intensity of temporally subsequent one of the left-eye image and the right-eye image that are outputted from the combination unit, and outputs a composite signal while correcting the signal to or close to higher intensity.

The second combination unit of the present invention outputs a composite signal while correcting the signal to or close to higher intensity of the output signal according to an intensity difference between the intensity of the image stored in the memory and the intensity of temporally subsequent one of the left-eye image and the right-eye image that are outputted from the combination unit.

The light-emitting device control unit of the present invention may include a selection unit that generates a video signal by alternately selecting the video signals inputted from the even number of video signal lines and outputs the video signal from a smaller number of video signal lines than the even number of video signal lines at an operating frequency lower than the operating frequency of the video display unit, and a local control unit that detects a video feature quantity such as the intensity value of the video signal from the selection unit and determines the light-emission intensity value of the light emission area according to the video feature quantity.

The light-emitting device control unit of the present invention may include a plurality of local control units, each of which detects a video feature quantity such as the intensity value of the video signal from the video signal of the video signal line, determines the light-emission intensity value of the light emission area according to the video feature quantity, and outputs the light-emission intensity value, and one of a combination unit and a selection unit that output a signal to the light-emission device drive unit based on the signals from the plurality of local control units at an operating frequency lower than the operating frequency of the video display unit.

The light-emitting device of the video display device may include a plurality of light-emitting diodes.

The present invention can provide a video display device that can achieve local control for a high-quality 3D image while reducing extraneous radiation.

BRIEF DESCRIPTION OF THE DRAWINGS

FIG. 1 is a block diagram illustrating the configuration of a video display device according to a first embodiment;

DESCRIPTION OF THE EMBODIMENTS

Figure 2A:
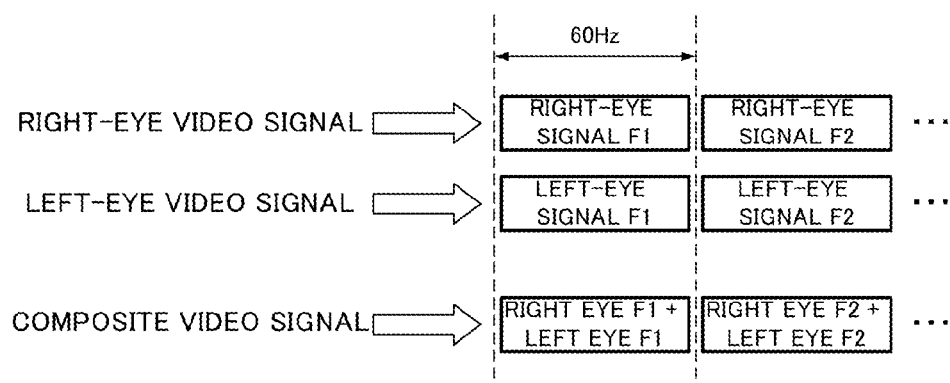
FIG. 2A shows video signals inputted to the video display device.

Embodiments will be specifically described below with reference to the accompanying drawings. The same parts in the drawings are indicated by the same reference numerals and are not repeatedly explained.

(First Embodiment)

FIG. 1 is a block diagram illustrating the configuration of a video display device 100 according to a first embodiment. As illustrated in FIG. 1, the video display device 100 receives a right-eye video signal 101$a$ and a left-eye video signal 101$b$ as input video signals and includes a liquid crystal drive unit 102 and a liquid crystal panel 103 acting as a video display unit. The liquid crystal drive unit 102 acts as a video display drive unit for driving the liquid crystal panel 103 based on the right-eye video signal 101$a$ and the left-eye video signal 101$b$. The video display device 100 further includes an LED backlight 105 acting as a light-emitting device for illuminating the liquid crystal panel 103 with light from the back, an LED driver 104 acting as a light-emitting device drive unit for driving the LED backlight 105, and an LED control unit 110 acting as a light-emitting device control unit. The LED control unit 110 determines the light-emission intensity value of the LED backlight 105 based on the right-eye video signal 101$a$ and the left-eye video signal 101$b$ and controls and operates the LED driver 104 at an operating frequency lower than that of the liquid crystal panel 103. In the present embodiment, the LED control unit 110 includes a combination unit 109 that combines the right-eye video signal 101$a$ and the left-eye video signal 101$b$ to output a composite video signal 101$c$, and a local control unit 106 that determines the light emission intensity of the LED backlight 105 based on the composite video signal 101$c$. The LED driver 104 drives the LED backlight 105 based on an intensity command value from the local control unit 106. Reference numeral 115$a$ in FIG. 1 denotes a first video signal line that receives the right-eye video signal 101$a$, and reference numeral 115$b$ denotes a second video signal line that receives the left-eye video signal 101$b$.

The video display device 100 is provided with a 2D-3D converter circuit or a 3D image converter circuit (not shown) that is located prior to the video display device 100 and outputs the right-eye video signal 101$a$ and the left-eye video signal 101$b$ to the liquid crystal drive unit 102 and the combination unit 109. In this case, the 2D-3D converter circuit generates a 3D video signal from a typical 2D video signal by signal processing. The 3D image converter circuit converts a 3D image, which has been inputted through a 3D broadcast tuner or an apparatus complying with HDMI of version 1.4 or higher for 3D images, into a progressive (noninterlaced) full-screen image. Specifically, the 3D image converter circuit converts a 60-Hz 3D video signal inputted through a signal line system with SIDE-BY-SIDE-HALF resolution of 1920×1080i, into left and right two-system output images with resolution of 1920×1080p by expansion and I/P conversion.

FIG. 2A shows the video signals that are outputted from the 2D-3D converter circuit or the 3D image converter circuit of the preceding stage and then are inputted to the video display device 100. Generally, in a digital 2D video display device, I/P converted video signals for both eyes with resolution of 1920×1080p are handled. In the case of a 3D video display device that provides progressive display of images of the right-eye video signal 101$a$ and the left-eye video signal 101$b$ with resolution of 1920×1080 in a time sharing manner, a band twice as large as that in 2D video display is necessary. The processing speed of the video signal in 2D video display may be doubled in 3D video display in the video display device 100. In reality, a signal is generally split to two systems to obtain a band with a maintained processing speed. As shown in FIG. 2A, the right-eye video signal 101$a$ and the left-eye video signal 101$b$ are in-phase signals (simultaneously inputted), each having resolution of 1920×1080 and a frame period of 60 Hz. Reference character F in FIGS. 2A, 2B, and so on represents the prefix of a frame number.

These video signals (right-eye video signal 101$a$ and left-eye video signal 101$b$) are inputted to the liquid crystal drive unit 102. The liquid crystal drive unit 102 drives the liquid crystal panel 103 so as to display images based on the right-eye video signal 101$a$ and the left-eye video signal 101$b$ every 120 Hz. Typically, an image quality adjusting circuits (not shown) is inserted into the preceding stage of the liquid crystal drive unit 102. In the case where a video signal input part is split to two systems as in the present embodiment, an image adjusting circuit is provided for each of the video signal lines 115$a$ and 115$b$.

The right-eye video signal 101$a$ and the left-eye video signal 101$b$ are combined in the combination unit 109 and are outputted as the composite video signal 101$c$ shown in FIG. 2A. As has been discussed, the left and right video signals are in phase (simultaneously inputted) and thus the composite video signal 101$c$ containing left and right video information can be obtained only by, for example, simple averaging.

The LED backlight 105 will be described below. The LED backlight 105 illuminates the liquid crystal panel 103 from the back. The LED backlight 105 is composed of LED (light-emitting diode) elements that are light emitting elements. The LED driver 104 can control the light emission intensity of each group containing at least one LED element. In other words, the LED backlight 105 has light emission areas controllable with different intensity values for the respective display areas of the liquid crystal panel 103. The optical configuration of the LED backlight 105 includes an array of multiple LED elements on the back of the liquid crystal panel 103. Alternatively, the optical configuration includes a light guide plate placed on the back of the liquid crystal panel 103 and multiple LED elements arranged on lines intersecting at right angles on a surface of the light guide plate parallel to the liquid crystal panel 103.

In the LED control unit 110, the composite video signal 101$c$ combined in the combination unit 109 is inputted to the local control unit 106 to extract a video feature quantity in the local control unit 106. In this case, the video feature quantity is information including an average intensity value, maximum intensity, and minimum intensity. The video feature quantity is extracted for each partial display area determined by dividing the display area of the liquid crystal panel 103 on which the composite video signal 101$c$ is displayed with resolution of 1920×1080. Typically, the partial area is aligned with a unit of control for the backlight emission intensity of the liquid crystal panel 103 illuminated by the LED backlight 105. Then, backlight emission intensity at a position corresponding to a feature quantity extraction area is determined according to the extracted video feature quantity. The determined light emission intensity is transmitted to the LED driver 104 by serial communications using a serial peripheral interface (SPI), an inter-integrated circuit (I2C), and so on. Since the composite video signal 101$c$ for detecting a video feature quantity is a 60-Hz signal, as shown in FIG. 2B, the light emission intensity is also recalculated every 60 Hz and then is transmitted to the LED driver 104.

Figure 2B:
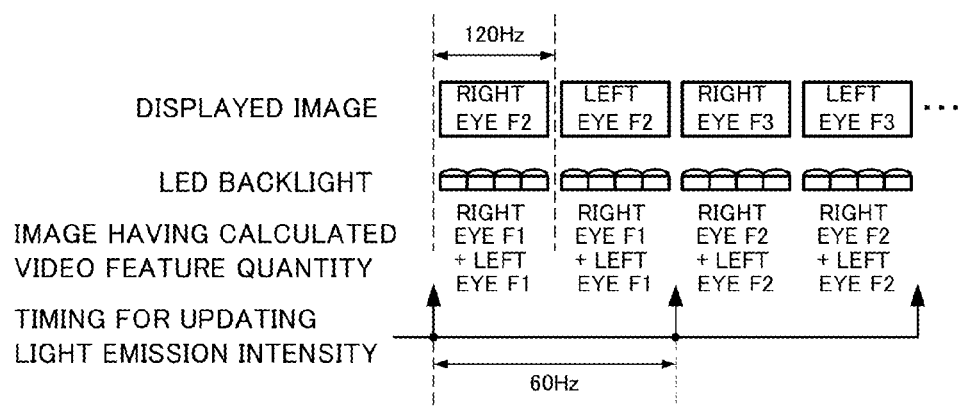
FIG. 2B shows the relationship between a displayed image of the video display device, a frame rate, and the timing for updating light emission intensity.

As shown in FIG. 2B, a video feature quantity and light emission intensity are calculated, and the light emission intensity is updated and reflected on the LED backlight 105 with a half rate of the frame rate of a displayed image. Right-eye images and left-eye images are alternately displayed on the liquid crystal panel 103 every 120 Hz. The light emission intensity of the LED backlight 105 for illuminating the image from the back is a common value used in left and right image periods having the same frame number. The light emission intensity is calculated from right-eye video information and left-eye video information, and thus an unnatural view hardly occurs in a period during which either of the right and left images is displayed on the liquid crystal panel 103. Regarding "the state of light emission", however, LED elements are typically driven under pulse width modulation (PWM) control in which backlight blinking and backlight scanning are used in combination. The driving period is a frequency equivalent to an integral multiple of the period of a displayed image.

In this case, the video signal inputted to the preceding circuit of the video display device 100 has SIDE-BY-SIDE-HALF resolution of 1920×1080i and a frequency of 60 Hz. The video format, the resolution, and the frequency are not particularly limited, also in the description of a second embodiment, which will be described later.

In the video display device 100, the video signals are inputted through the two video signal lines 115*a* and 115*b*. This configuration is described for comparison with an input through the single video signal line of the conventional 2D video display device. Video signals may be inputted from, for example, four video signal lines (a right-eye video clock and a left-eye video clock are reduced by one-half and a signal line is added for each of the right-eye and left-eye video clocks to obtain a band). In this case, the video signals are inputted to the liquid crystal drive unit 102 and the combination unit 109 from the four signal lines. The number of used local control units is two as in the conventional 2D video display device that receives images through two local control units. Light emission intensity command values from the two local control units are averaged to calculate final light emission intensity. In this way, light emission intensity is finally updated with a half period of a displayed image. This is also true in the second embodiment, which will be described later.

Figure 3:
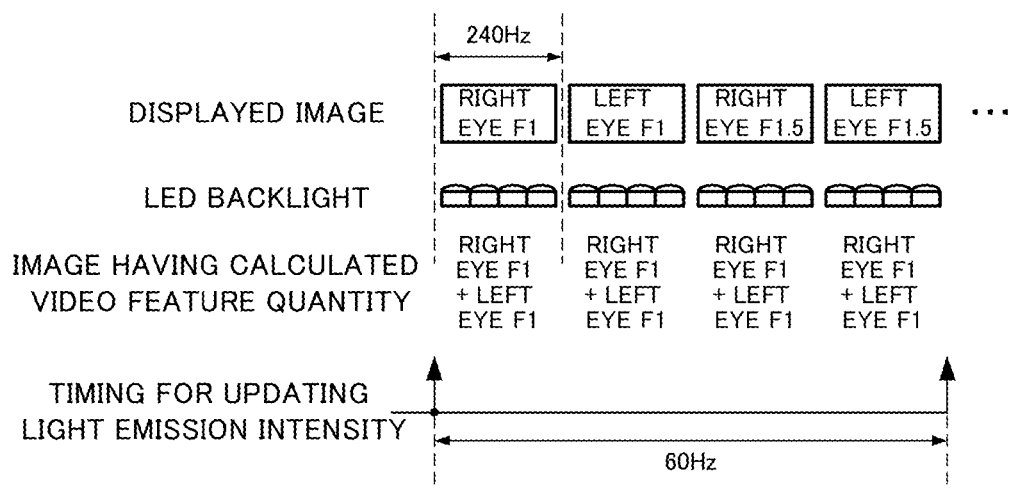
FIG. 3 shows the relationship between a displayed image and the timing for updating light emission intensity in the case where a so-called double-speed engine is provided in the preceding circuit of the video display device.

Additionally, an image quality adjusting circuit located prior to the liquid crystal drive unit 102 may include a so-called "double-speed engine". The double-speed engine is a circuit that outputs an image with a higher frame rate than an input frame rate by frame interpolation. Instead of simple conversion to a frame rate of an integral multiple, a 24-Hz image can be converted to a 60-Hz image, or a 50-Hz image can be converted to a 60-Hz image by 2-3 pulldown. In this example, left and right 60-Hz video signals (the right-eye video signal 101*a* and the left-eye video signal 101*b*) are converted to 120-Hz video signals. In order to keep the processing speed of the video signal for each pixel, two video signal paths need to be added for the doubled information amount of the video signal. Thus, the output video signal of the double-speed engine is inputted to the liquid crystal drive unit 102 through two left video signal lines and two right video signal lines, that is, four video signal lines in total. Finally, the right-eye video signal 101*a* and the left-eye video signal 101*b* are alternately displayed on the liquid crystal panel 103 every 240 Hz. Local contrast control is performed by the local control unit 106 based on the composite video signal 101*c* with a frequency of 60 Hz. In other words, as shown in FIG. 3, the same light emission intensity is adapted for four frame periods of displayed images on the liquid crystal panel 103. FIG. 3 corresponds to FIG. 2B. F1.5 in FIG. 3 indicates a frame generated by interpolation based on frames F1 and F2. Typically, frame interpolation causes a delay from an image in theory. In this case, it is assumed that a delay of one frame occurs when the video signal is inputted. Thus, as shown in FIG. 3, the frame number integer portion of a displayed image matches with a frame number obtained by calculating light emission intensity based on a video feature quantity. This allows local control with light emission intensity based on a displayed image with the same frame as the displayed image, and thus the local control is performed in a suitable state for the image. This is also true in the second embodiment, which will be described later.

Furthermore, light emission intensity determined by the local control unit 106 may be inputted to the image quality adjusting circuit located prior to the liquid crystal drive unit 102, and then the video signal may be corrected according to the light emission intensity. The image correction can improve the quality of a final image displayed by a combination of an image on the liquid crystal panel 103 and the intensity of the partially controlled LED backlight. This is also true in the second embodiment, which will be described later.

The video display device 100 can receive and display a 2D image as well as a 3D image. In this case, a 2D image, that is, a laterally identical video signal is passed through, for example, the first video signal line 115*a* that is the path of the right-eye video signal illustrated in FIG. 1. The path of the second video signal line 115*b* for the left-eye video signal is left unused. The inputted video signal has resolution of, for example, 1920×1080p and a frequency of 60 Hz. The liquid crystal drive unit 102 drives the liquid crystal panel 103 with the same frame rate as the frame rate of the video signal inputted to the liquid crystal drive unit 102. The composite video signal 101*c* is a video signal to be inputted to the local control unit 106 that determines the light emission intensity of the LED backlight 105 based on an input video signal. The LED driver 104 updates the light emission intensity of the LED backlight 105 in synchronization with the frame rate of an image displayed on the liquid crystal panel 103. The light emission intensity is updated at each update of the frame. A double-speed engine may be provided prior to the liquid crystal drive unit 102.

As has been discussed, the video display device 100 of the present embodiment can reduce a serial transfer period to the LED driver 104 by one-half (for example, from 120 Hz to 60 Hz), thereby reducing the influence of radiation that is caused by serial communications with the LED driver 104 with a short period equivalent to the frame rate of an image. This can considerably reduce the possibility of adverse effects of noise on other electronic components. The influence of radiation may be disadvantageous in a 3D video display device that displays a right-eye image and a left-eye image in a time-sharing manner. Furthermore, the light-emission intensity value of the light emission area is determined based on the right-eye video signal 101*a* and the left-eye video signal 101*b*, achieving local control for a high-quality 3D image. Specifically, local control only based on one of the right-eye video signal 101*a* and the left-eye video signal 101*b* may cause unbalanced intensity when an image for the other viewpoint is displayed. The present embodiment can suppress the occurrence of such a problem.

Figure 14:
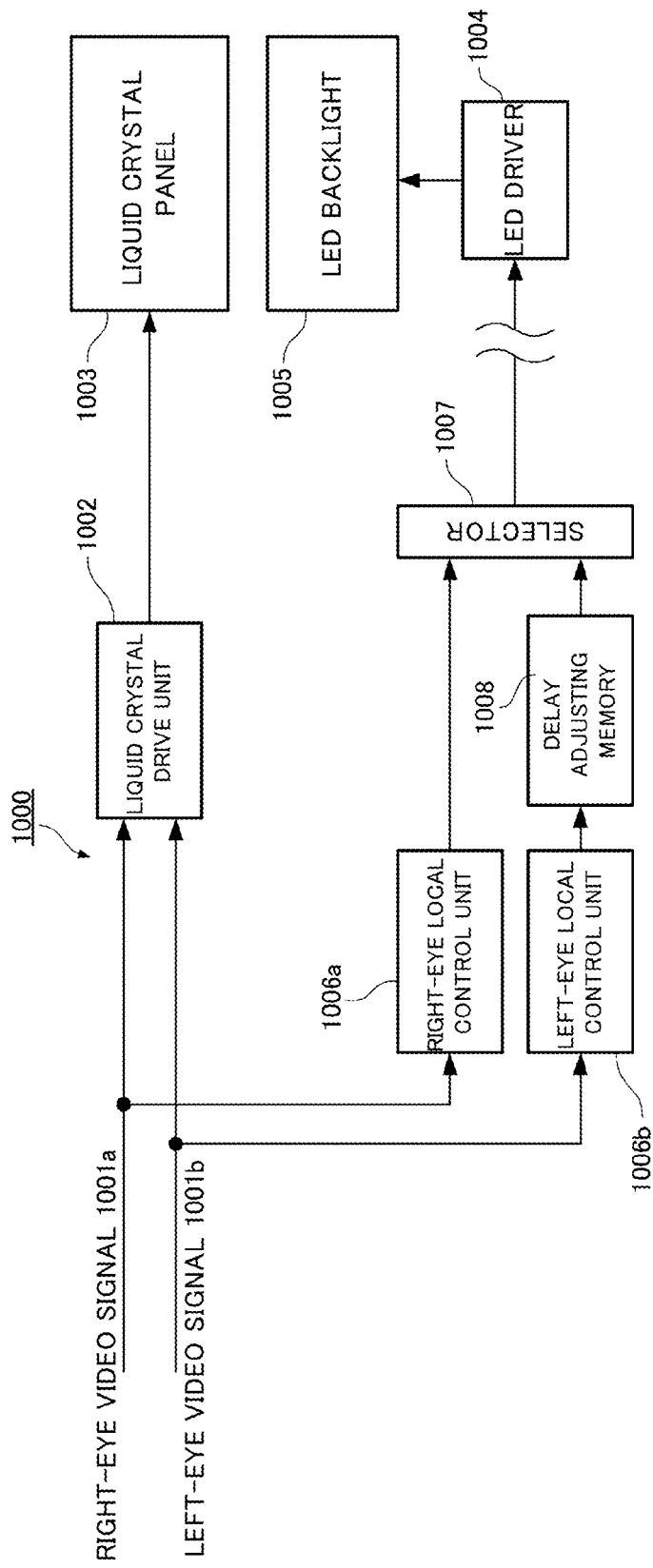
FIG. 14 is a block diagram illustrating the configuration of a conventional video display device.
Figure 15A:
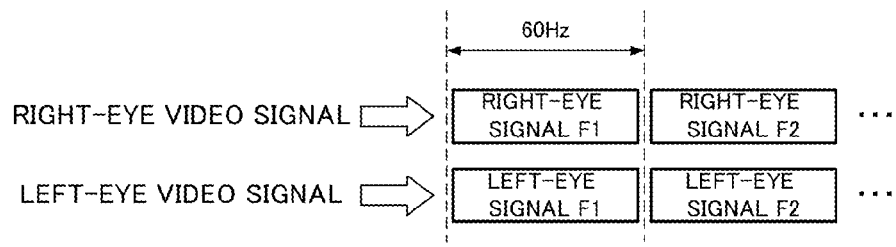
FIG. 15A shows video signals inputted to the conventional video display device.
Figure 15B:
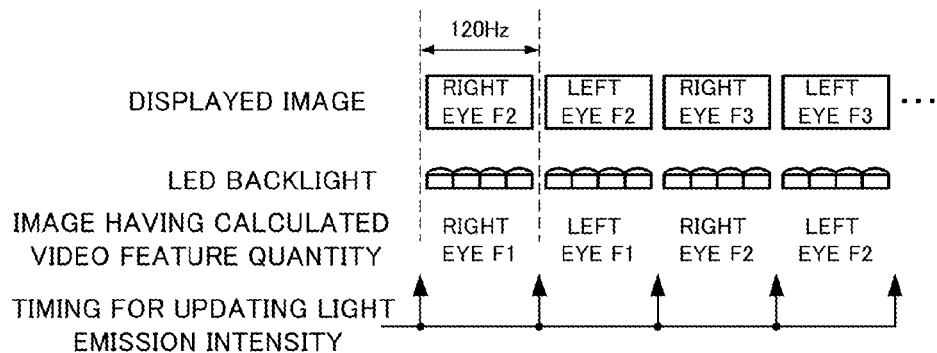
FIG. 15B shows the relationship between a displayed image of the conventional video display device and the timing for updating light emission intensity.

In the video display device 100 of the present embodiment, the video signals are simultaneously inputted from the left and right video signal lines 115*a* and 115*b*; meanwhile, local contrast control is performed based on the combined signal. This can achieve the unified local control unit 106 and a smaller delay memory or selector, leading to a smaller circuit size without a reduction in display quality, unlike in the conventional video display device 1000 illustrated in FIG. 14.

Figure 4:
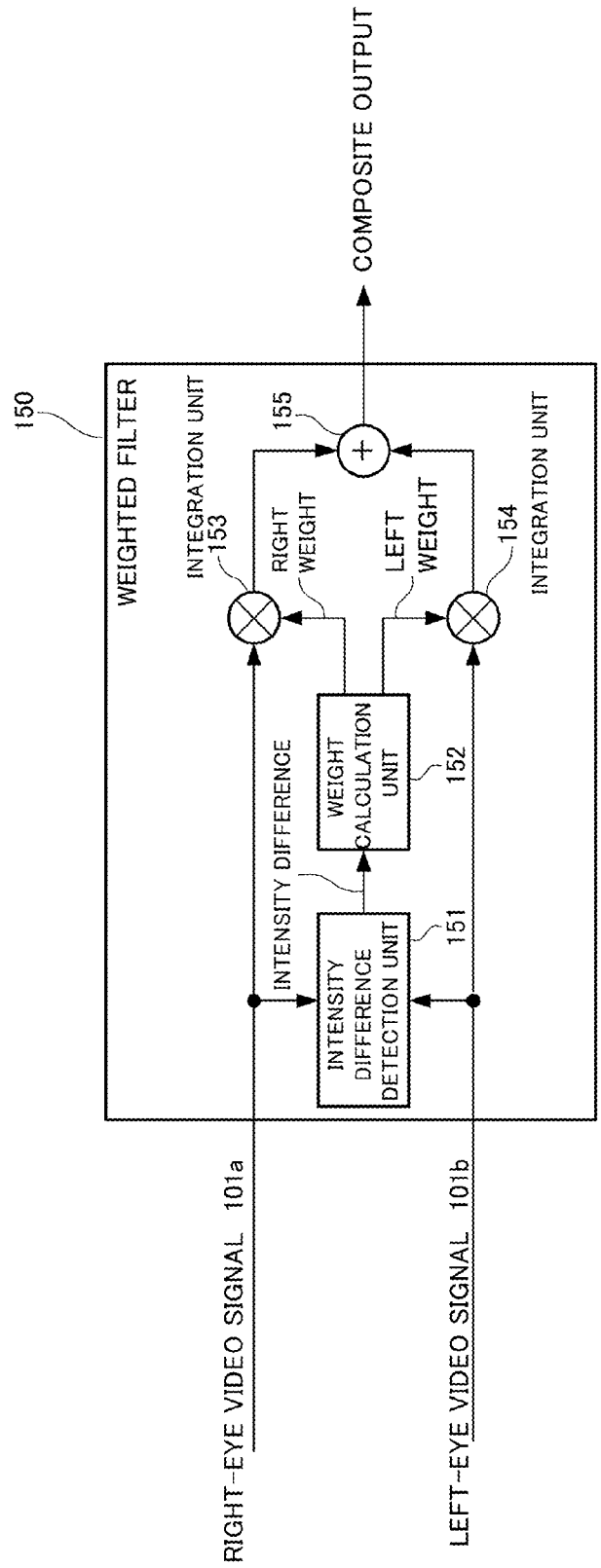
FIG. 4 is a block diagram illustrating a combination unit in the configuration of a video display device according to a modification of the first embodiment.

In the present embodiment, the right-eye video signal 101*a* and the left-eye video signal 101*b* are simply averaged into the composite signal in the combination unit 109. The configuration is not particularly limited. For example, a two-dimensional table corresponding to the intensity values of the right-eye video signal 101*a* and the left-eye video signal 101*b* may be stored beforehand in the combination unit 109 to output the total value of the intensity values. In another example, the intensity of the left-eye image and the intensity of the right-eye image may be compared with each other to output a composite signal with weighted intensity while correcting the signal to or close to higher intensity. For example, in the weighting method, the combination unit 109 in FIG. 1 is preferably replaced with a weighted filter 150 schematically illustrated in FIG. 4.

The weighted filter 150 includes an intensity difference detection unit 151, a weight calculation unit 152, integration units 153 and 154, and an addition unit 155. When the right-eye video signal 101a and the left-eye video signal 101b are inputted to the weighted filter 150, the intensity difference detection unit 151 first detects an intensity difference (with a plus or minus) based on information about right-eye light emission intensity included in the right-eye video signal 101a and information about left-eye light emission intensity included in the left-eye video signal 101b. After that, a weight is assigned according to the intensity difference in the weight calculation unit 152 and the integration units 153 and 154.

Figure 5:
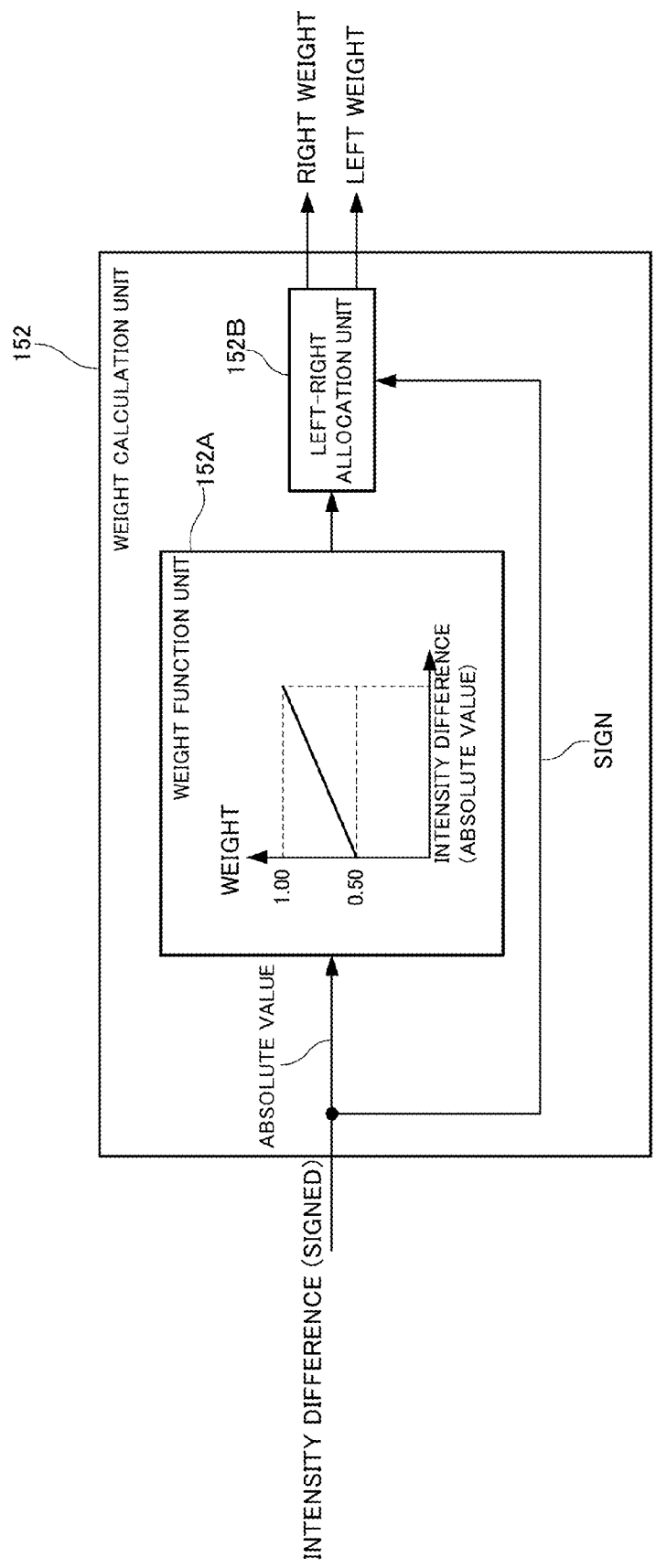
FIG. 5 is a block diagram illustrating a weight calculation unit for implementing the combination unit in the configuration of the video display device according to the modification of the first embodiment.

FIG. 5 shows a specific example of the weight calculation unit 152. The weight calculation unit 152 includes a weight function unit 152A and a left-right allocation unit 152B. As the absolute value of the intensity difference increases, a weight is more preferably assigned to have higher intensity. Hence, in the case of a large intensity difference, a reduction in contrast can be advantageously minimized unlike in simple averaging that reduces intensity more than necessary (for example, in half).

Figure 6:
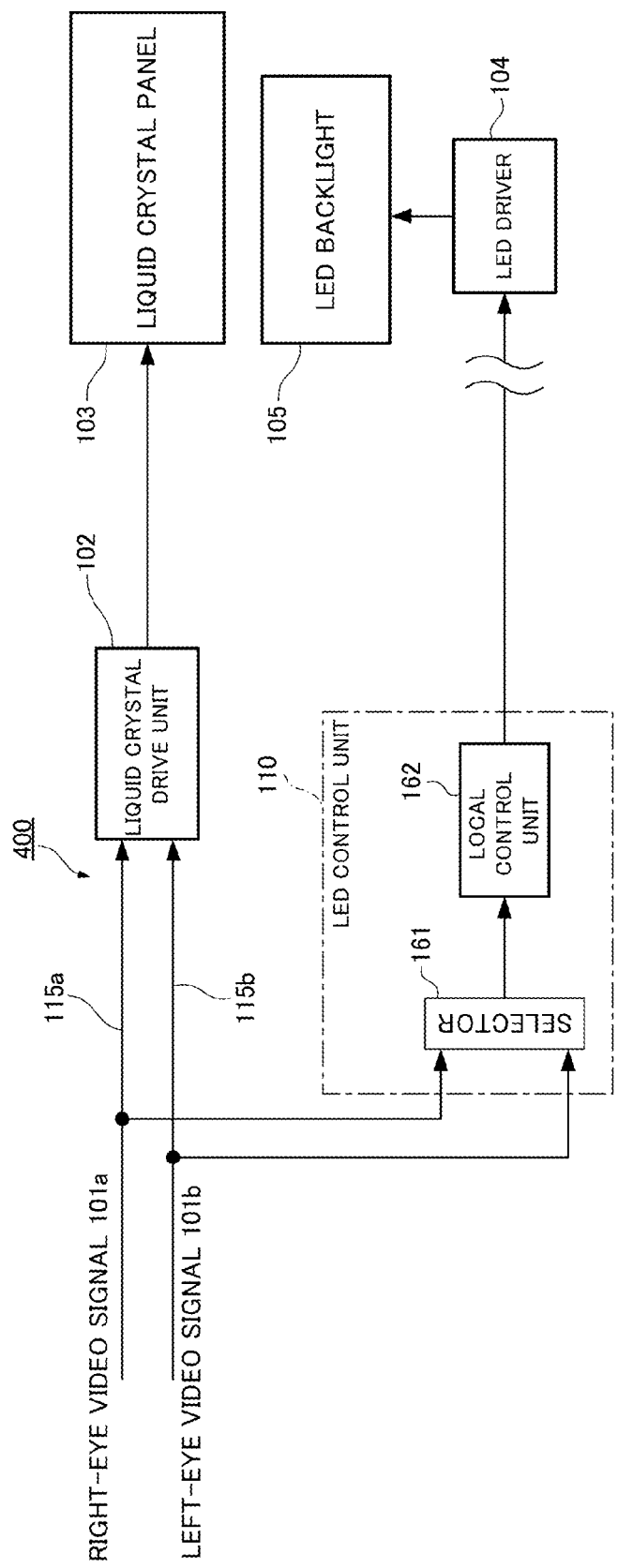
FIG. 6 is a block diagram showing the configuration of a video display device according to another modification of the first embodiment.
Figure 7A:
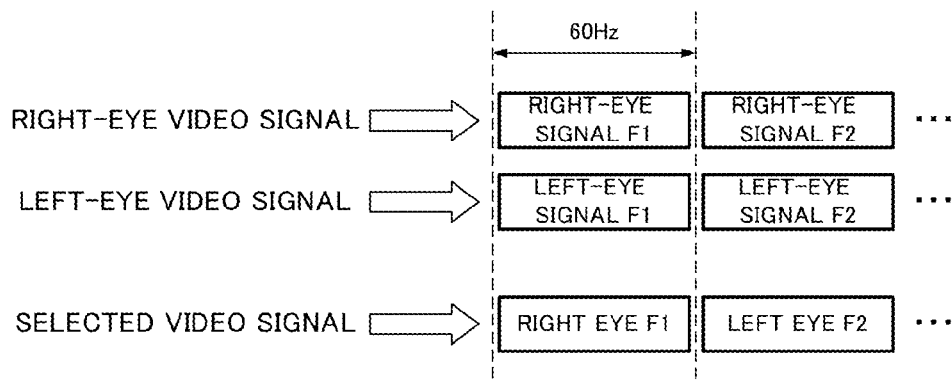
FIG. 7A shows video signals inputted to the video display device according to the modification.
Figure 7B:
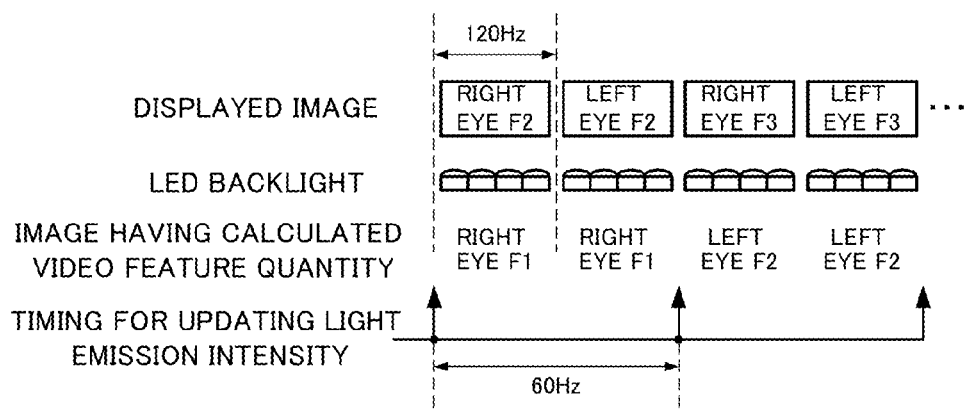
FIG. 7B shows the relationship between a displayed image of the video display device, a frame rate, and the timing for updating light emission intensity according to the modification.

In the present embodiment, the LED control unit 110 includes the combination unit 109 and the local control unit 106. The configuration is not particularly limited. FIG. 6 illustrates a modification of the first embodiment. In a video display device 400, an LED control unit 160 includes a selector 161 acting as a selection unit and a local control unit 162. As shown in FIG. 7A, the selector 161 switches the right-eye video signal 101a and the left-eye video signal 101b at 60 Hz and then output the selected signal to the local control unit 162. The local control unit 162 determines the light emission intensity of the LED backlight 105 based on the video signal selected by the selector 161. Constituent elements other than the LED control unit 160 in the video display device 400 are identical to those of the video display device 100 and thus the explanation thereof is omitted.

The video display device 400 can reduce a serial transfer period to the LED driver 104 by one-half (for example, from 120 Hz to 60 Hz), thereby reducing the influence of radiation that is caused by serial communications with the LED driver 104 with a short period equivalent to the frame rate of an image. This can considerably reduce the possibility of adverse effects of noise on other electronic components. The influence of radiation may be disadvantageous in a 3D video display device that displays a right-eye image and a left-eye image in a time-sharing manner. Furthermore, the light-emission intensity value of a light emission area is determined based on the right-eye video signal 101a and the left-eye video signal 101b, achieving local control for a 3D image with relatively high quality.

(Second Embodiment)

Figure 8:
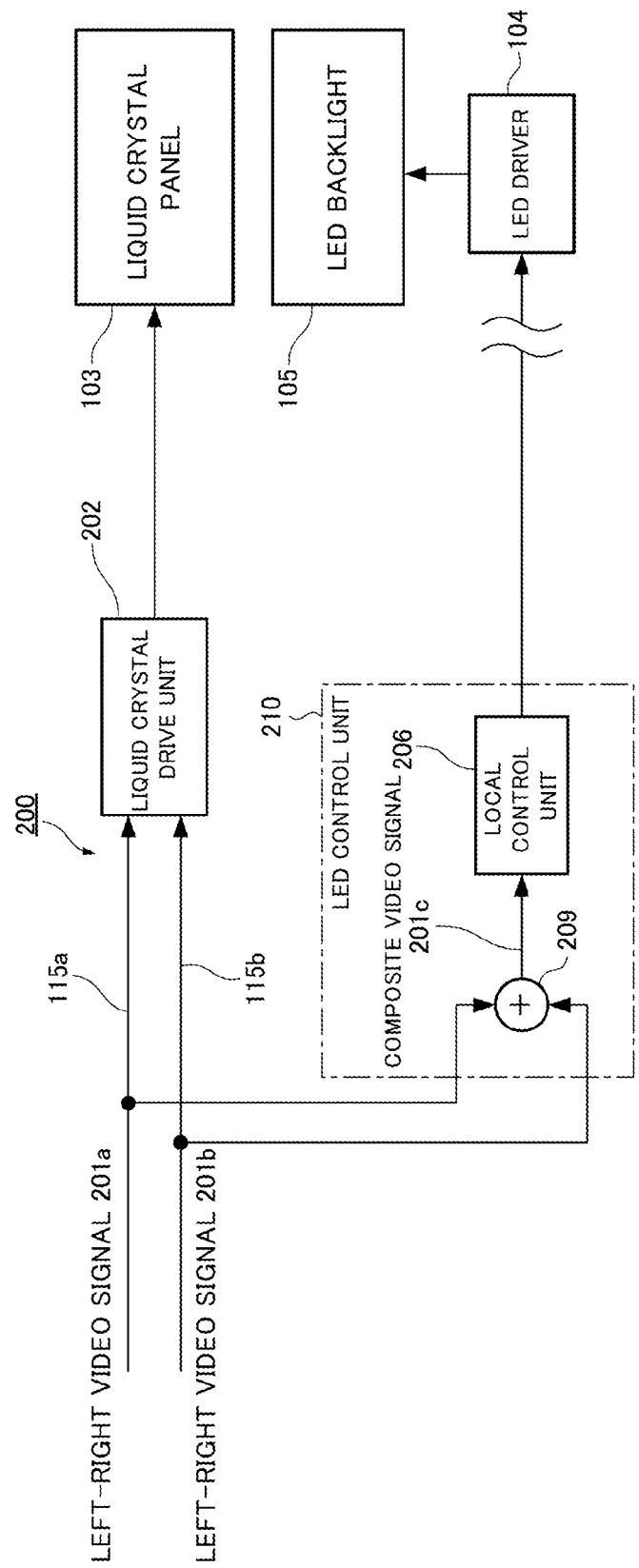
FIG. 8 is a block diagram illustrating the configuration of a video display device according to a second embodiment.

FIG. 8 is a block diagram illustrating the configuration of a video display device 200 according to a second embodiment. FIG. 8 corresponds to FIG. 1 of the first embodiment. The video display device 200 of the second embodiment is different from the video display device 100 of the first embodiment in FIG. 1 in that different left-right video signals 201a and 201b are inputted in a transmission format. Furthermore, a liquid crystal drive unit 202 acting as a video display drive unit for driving a liquid crystal panel 103 based on the left-right video signals 201a and 201b performs different internal processing from that of the liquid crystal drive unit 102 of the first embodiment. The video display device 200 further includes an LED control unit 210 acting as a light-emitting device control unit that determines the light-emission intensity value of an LED backlight 105 based on the left-right video signals 201a and 201b and controls and operates an LED driver 104 at an operating frequency lower than that of the liquid crystal panel 103. The LED control unit 210 includes a combination unit 209 and a local control unit 206. The function of the combination unit 209 is also different from that of the combination unit 109 of the first embodiment. The combination unit 209 outputs a composite video signal 201c in a different format from that of the composite video signal 101c. Moreover, the local control unit 206 is different from the local control unit 106 of the first embodiment in that the local control unit 206 detects a video feature quantity, e.g., an intensity value for the composite video signal 201c.

Specifically, the video display device 200 of the second embodiment includes the liquid crystal drive unit 202 that receive the different left-right video signals 201a and 201b from two video signal lines 115a and 115b and drives the liquid crystal panel 103 based on the left-right video signals 201a and 201b, the liquid crystal panel 103 acting as a video display unit, the LED backlight 105 that illuminates the liquid crystal panel 103 with light from the back, the LED driver 104 that acts as a light-emitting element drive unit for driving the LED backlight 105, and the LED control unit 210 acting as a light-emitting element control unit that determines the light-emission intensity value of the LED backlight 105 based on the left-right video signals 201a and 201b and controls and operates the LED driver 104 at an operating frequency lower than that of the liquid crystal panel 103. The LED control unit 210 includes the combination unit 209 that combines the left-right video signals 201a and 201b and outputs the combined signal as the composite video signal 201c, and the local control unit 206 that determines the light emission intensity of the LED backlight 105 based on the composite video signal 201c. The LED driver 104 drives the LED backlight 105 based on an intensity command value from the local control unit 206.

Also in the present embodiment, a 3D video signal with SIDE-BY-SIDE-HALF resolution of 1920×1080i and a frequency of 60 Hz is inputted to a preceding circuit from a single signal line, the preceding circuit connected to the signal line generates signals with resolution of 1920×1080p for the right and left sides, and then the signals are outputted from the two video signal lines 115a and 115b as shown in FIG. 8.

Figure 9A:
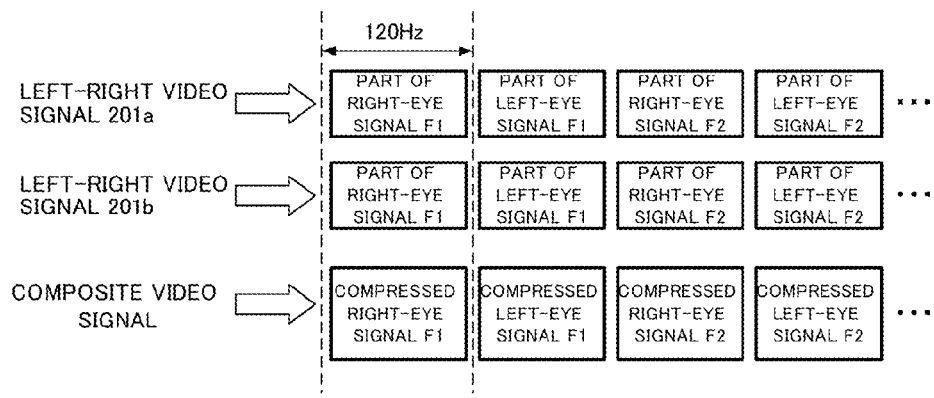
FIG. 9A shows video signals inputted to the video display device.

In the video display device 100 of the first embodiment, the right-eye video signal 101a and the left-eye video signal 101b from the preceding circuit of the video display device 100 are inputted separately from the two video signal lines 115a and 115b into the video display device 100, whereas in the video display device 200 of the second embodiment, a video information amount is reduced by one-half on each of the video signal lines 115a and 115b while the left and right video signals to be outputted are alternately switched every 120 Hz. In such transmission through the two video signal lines 115a and 115b, a video information amount transmitted every 60 Hz is equal to the information amount of the video signal inputted to the video display device 100 every 60 Hz according to the first embodiment. FIG. 9A shows the state corresponding to FIG. 2A of the first embodiment. Right-eye video information and left-eye video information are split to the two different signal lines 115a and 115b such that "the video information is vertically arranged on a screen (upper half and lower half)", "the video information is laterally arranged on a screen (left half and right half)", or "the video information is split to even-numbered pixels and odd-numbered pixels".

The liquid crystal drive unit 202 alternately displays a right-eye image and a left-eye image on the liquid crystal panel 103 every 120 Hz based on the left-right video signals inputted from the two video signal lines 115a and 115b at 120 Hz. Thus, the switching period of right-eye and left-eye images inputted to the liquid crystal drive unit 202 is equal to the switching period of right-eye and left-eye images to be displayed on the liquid crystal panel 103. This allows the liquid crystal drive unit 202 of the second embodiment to have a simple circuit configuration as compared with the liquid crystal drive unit 102 of the video display device 100 according to the first embodiment.

In the combination unit 209, the composite video signal 201c is generated so as to switch the right-eye and left-eye video signals every 120 Hz like the input signals from the video signal lines 115a and 115b. In the combination unit 109 of the video display device 100 according to the first embodiment, a right-eye image and a left-eye image are combined. In the second embodiment, when a right-eye image is inputted, video signal information from the two signal lines is combined to obtain full-screen information for a right eye. Similarly, when a left-eye image is inputted, video signal information from the two signal lines is combined to obtain full-screen information for a left eye. However, the composite video signal 201c is outputted from the combination unit 209 through the single signal line with a processing speed maintained for each pixel, and thus the full-screen information is compressed in at least one of a horizontal direction and a vertical direction so as to contain composite video signal information in the band of the single signal line. Specifically, the combination unit 209 combines the video signals inputted from the video signal lines 115a and 115b with the same frame period, generating a left-eye image or a right-eye image corresponding to the left-eye image. The generated right-eye image and the left-eye image are outputted in a temporally independent and sequential manner. In the case where the inputted left-right video signals are inputted to the respective two signal lines for "even-numbered pixels and odd-numbered pixels", one of the left-right video signals is directly outputted from the combination unit 209 while the other left-right video signal is not outputted, eliminating the signal combination. In this case, the outputted composite video signal 201c can be considered to substantially contain full screen information because the composite video signal 201c contains data about even-numbered or odd-numbered pixels evenly distributed over the screen, unlike a video signal split to upper and lower halves or left and right halves. Since one of the input video signals for the respective two signal lines is directly outputted, the information amount is originally contained within the band of the single signal line.

The local control unit 206 calculates a video feature quantity and light emission intensity each time the input of the local control unit 206 is switched between a composite video signal for a right screen and a composite video signal for a left screen. The local control unit 206 according to the second embodiment performs calculations with a period twice as long as that of the local control unit 106 provided in the video display device 100 according to the first embodiment. However, a video information amount to be inputted is reduced by one-half, allowing the existing local control unit to be used as it is without providing two local control units.

Figure 9B:
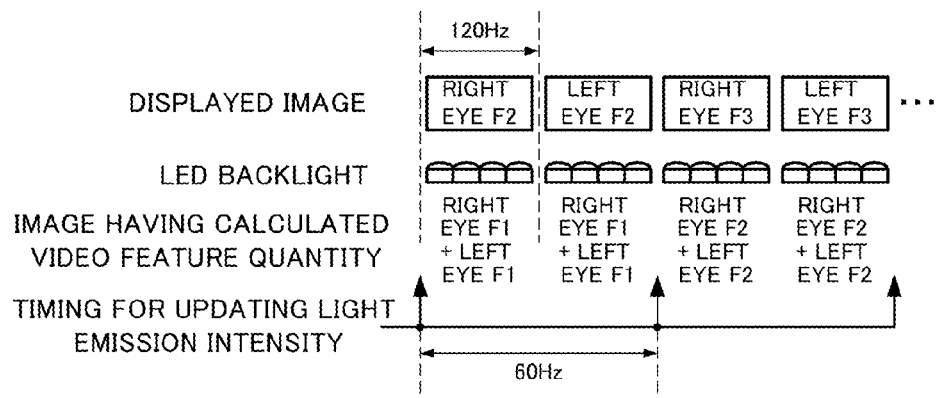
FIG. 9B shows the relationship between a displayed image of the video display device and the timing for updating light emission intensity.
Figure 10:
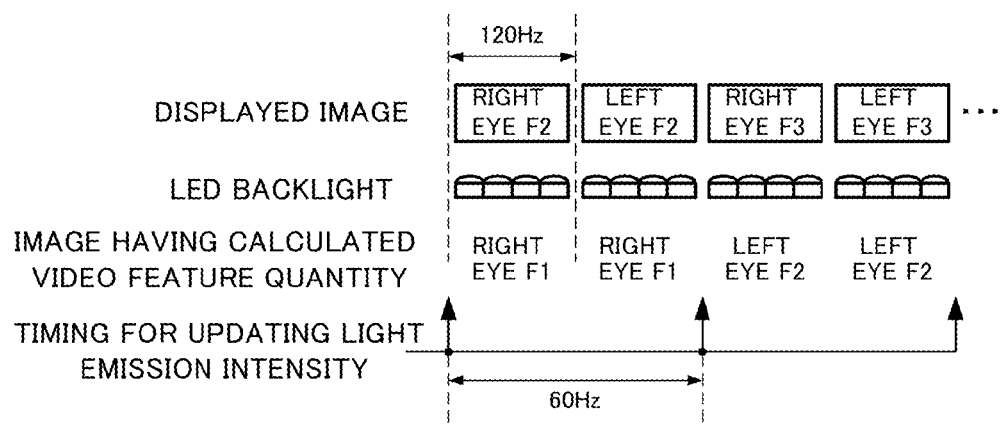
FIG. 10 shows the relationship between a displayed image of a video display device and the timing for updating light emission intensity according to a modification of the second embodiment.

The local control unit 206 includes a time-axis filter of infinite impulse response (IIR) that is inserted into the output stage of the local control unit 206. The local control unit 206 sums the calculation results of light emission intensity of left and right images and then transmits a light emission intensity command value to the LED driver 104 every 60 Hz. Naturally, the light emission intensity of the LED backlight 105 is updated every 60 Hz. This state is shown in FIG. 9B. The calculation results of light emission intensity of left and right images are averaged through the filter provided along the time axis to obtain final light emission intensity. Thus, even shared application between right and left eyes can obtain a displayed image of high display quality. The time-axis filter may reset a previous value every 60 Hz or keep outputting results without resetting the value. "Image with calculated feature quantity" in FIG. 9B indicates the frame numbers of inputted images having been equivalently calculated by summing the results by the time-axis filter.

The video display device 200 receives and displays a 2D image as well as a 3D image. In this case, in response to the left and right video signals inputted from the two video signal lines 115a and 115b, a 2D image, that is, a laterally identical video signal is transmitted when one of the right-eye and left-eye video signals is inputted. When the other video signal is inputted, the video signal is properly masked (discarded without being transmitted). The video signals inputted from the two video signal lines have, for example, resolution of 960×1080p and a frequency of 60 Hz. The liquid crystal drive unit 202 drives the liquid crystal panel 103 to display the inputted images as signals having resolution of 1920×1080p and a frequency of 60 Hz on the liquid crystal panel 103 with a frame rate of 60 Hz. In this case, although the combination unit 209 operates as in the case of 3D display, the composite video signal 201c includes an effective video signal and a properly masked video signal that are alternately outputted every 120 Hz unlike in 3D display. Thus, the local control unit 206 may calculate a video feature quantity and light emission intensity every 60 Hz. Other configurations are similar to those of the first embodiment. Additionally, a double-speed engine may be provided prior to the liquid crystal drive unit 202.

As has been discussed, in the video display device 200 according to the second embodiment, the video signals for outputting a right-eye image and a left-eye image are inputted to the respective systems. Local contrast control based on the composite video signal containing full-screen video information generated by the video signals can unify the local control unit and achieve a smaller delay memory and selector without deteriorating display quality, leading to a smaller circuit size than in the conventional video display device shown in FIG. 14. Also for the combination unit 209, the video signal split to the signal lines for "even-numbered pixels and odd-numbered pixels" can be directly outputted, greatly reducing the circuit size.

The local control unit 206 further includes the time-axis filter inserted into the output stage of the local control unit 206. The local control unit 206 sums the calculation results of light emission intensity of left and right images and then transmits a light emission intensity command value to the LED driver 104 every 60 Hz. Thus, the video display device 200 according to the second embodiment can reduce a serial transfer period to the LED driver 104 by one-half (e.g., from 120 Hz to 60 Hz) without deteriorating image quality. With this configuration, the video display device 200 according to the second embodiment can suppress the influence of radiation caused by serial communications with the LED driver in a period as short as the frame rate of an image. The influence of radiation causes a problem in a 3D video display device that displays right-eye and left-eye images in a time sharing manner.

The IIR time-axis filter inserted into the output stage of the local control unit 206 may be replaced with a time-sharing updating unit (not shown) that alternately updates light emission intensity command values in a time sharing manner. For example, updates are alternately made to a light emission intensity command value based on a right-eye image and a light emission intensity command value based on a left-eye image every 60 Hz. This configuration can also reduce a serial transfer period to the LED driver 104 by one-half (e.g., from 120 Hz to 60 Hz), suppressing the influence of radiation caused by serial communications with the LED driver 104 in a period as short as the frame rate of an image. The light-emission intensity value of a light emission area is determined based on the left-right video signals 201*a* and 201*b*, achieving local control for a high-quality 3D image unlike in local control performed based on only one of the right-eye video signal 101*a* and the left-eye video signal 101*b*.

The time-axis filter inserted into the output stage of the local control unit 206 may be replaced with the function of the weighted filter 150 according to the first embodiment to combine the light emission intensity of a right-eye image and the light emission intensity of a left-eye image and transmit a light-emission intensity command value to the LED driver 104 every 60 Hz. Specifically, the weighted filter 150 in FIG. 4 receives the light emission intensity of a right-eye image and the light emission intensity of a left-eye image instead of the right-eye video signal 101*a* and the left-eye video signal 101*b*. However, a phase difference between the light emission intensity of a left-eye image and the light emission intensity of a right-eye image needs to be absorbed by a delay memory. In this case, instead of the processing based on the intensity difference, the signals to be outputted may be combined while being simply corrected to or close to higher intensity.

Figure 11:
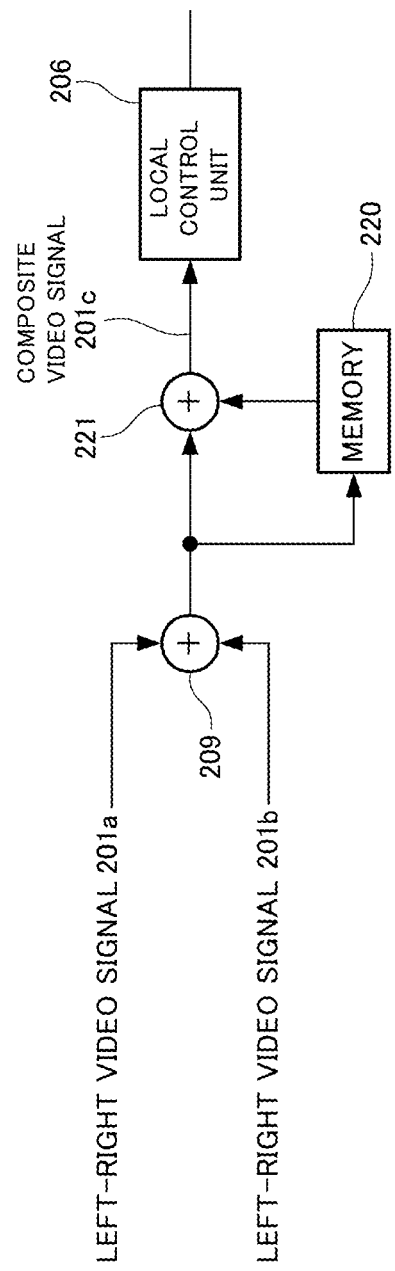
FIG. 11 is a block diagram illustrating a partial configuration of a video display device according to another modification of the second embodiment.

Instead of the time-axis filter inserted into the output stage of the local control unit 206, as schematically shown in FIG. 11, the LED control unit 210 may include a memory 220 that temporarily stores the right-eye composite video output of the combination unit 209, and a second combination unit 221 that combines a left-eye composite video output and the right-eye composite video output stored in the memory 220, from the output data of the combination unit 209. The composite video signal 201*c* combined with a frequency of 60 Hz in the second combination unit 221 may be inputted to the local control unit 206. This method can also reduce a serial transfer period to the LED driver 104, thereby suppressing the influence of radiation. The second combination unit 221 may be replaced with the weighted filter 150 described in the first embodiment. Furthermore, the second combination unit 221 may output the composite signal after simply correcting the composite signal to or close to higher intensity, instead of the processing performed by the weighted filter 150 based on an intensity difference.

With this configuration, the method of alternately outputting the left-right video signals 201*a* and 201*b* at 120 Hz is used to allow the liquid crystal drive unit 202 to alternately display a right-eye image and a left-eye image on the liquid crystal panel 103 every 120 Hz based on the left-right video signals inputted from the two video signal lines 115*a* and 115*b* at 120 Hz. This equalizes a switching period for right-eye and left-eye images inputted to the liquid crystal drive unit 202 and a switching period for right-eye and left-eye images to be displayed on the liquid crystal panel 103. Thus, the circuit configuration of the liquid crystal drive unit 202 can be simplified so as to greatly reduce the circuit size.

In the first and second embodiments, the liquid crystal drive units 102 and 202 and the liquid crystal panel 103 alternately display a right-eye image and a left-eye image in a time-sharing manner with a frame frequency of N. The present embodiment is partially applicable to a configuration for displaying right-eye and left-eye images on the same screen with a frame frequency of N/2. In this case, the present embodiment is different only in that the liquid crystal drive unit drives the liquid crystal panel 103 to display the right-eye and left-eye images on the liquid crystal panel 103 such that the right-eye image uses one half of the pixels of the liquid crystal panel 103 while the left-eye image uses the other half of the pixels. At this point, the right-eye and left-eye images do not need to be alternately displayed, reducing the frame rate of the displayed image to a half of the frame rate of time-sharing display.

Figure 12A:
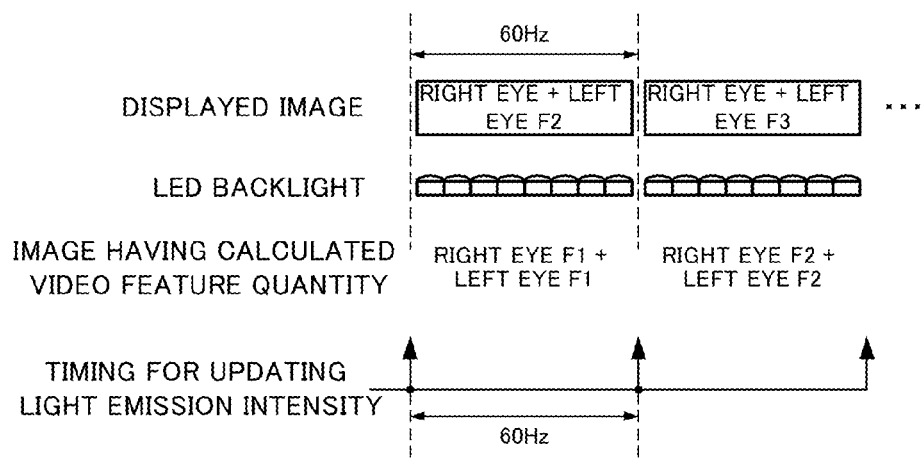
FIG. 12A shows the relationship between a displayed image and the timing for updating light emission intensity in the case where video signals are inputted to the video display device of the first embodiment in a simultaneous display system instead of a time-sharing display system.
Figure 12B:
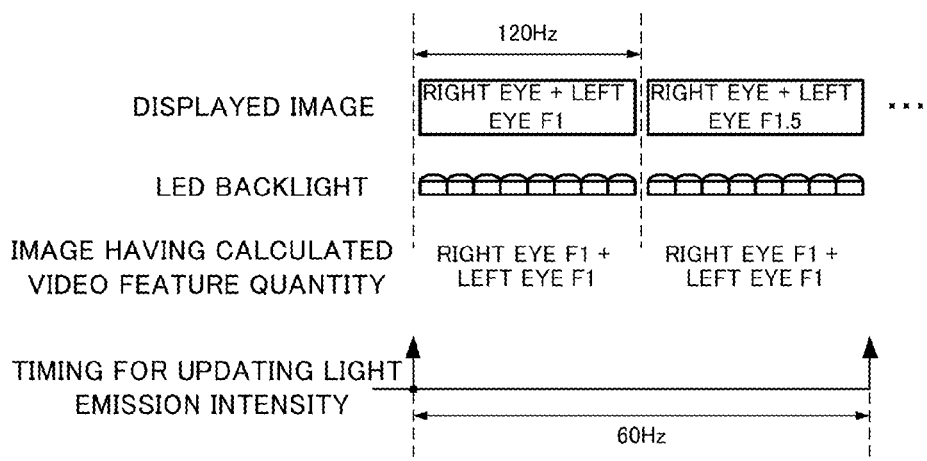
FIG. 12B shows the relationship between a displayed image and the timing for updating light emission intensity in the case where the video signals are inputted in the simultaneous display system instead of the time-sharing display system to the video display device including a double-speed engine.
Figure 13:
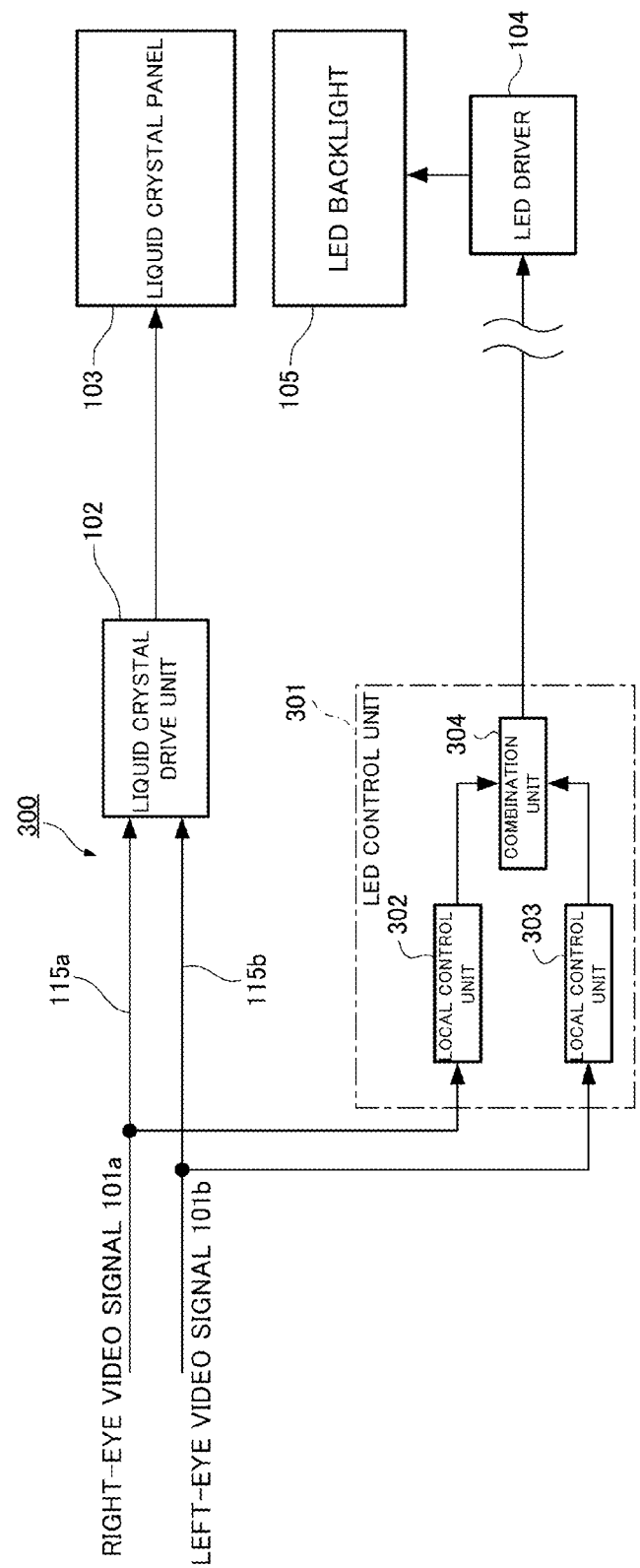
FIG. 13 is a block diagram illustrating the configuration of a video display device according to still another embodiment.

FIG. 12A shows simultaneous display of left and right images in comparison with time sharing display shown in FIG. 2B according to the first embodiment. FIG. 12B corresponds to FIG. 3. The simultaneous display of the left and right images in FIG. 12A also corresponds to time sharing display shown in FIG. 9B according to the second embodiment. The simultaneous display can also advantageously unify the local control unit.

In the foregoing embodiments, the LED control unit 110(210) acting as a light-emitting device control unit includes one of the combination unit 109(209) for combining left and right video signals and the selector 161 for selecting the left and right video signals, and the local control unit 106(206) that determines the light emission intensity of the LED backlight 105 based on the signal from one of the combination unit 109(209) and the selector 161. In other words, the video signals are combined to the single line by one of the combination unit 109(209) and the selector 161, and then the composite signal is processed in the single local control unit 106(162, 206). The processing is not particularly limited. Specifically, as illustrated in FIGS. 13 to 15B, an LED control unit 301 acting as a light-emitting device control unit in a video display device 300 may operate as follows: local control units 302 and 303 determine light emission intensity by separately processing video signals (e.g., the right-eye video signal 101*a*) inputted from the video signal lines 115*a* and 115*b*, the signals of the light emission intensity are processed by a combination unit (or a selection unit) 304 that includes an averaging filter and a two-dimensional table or an addition filter and a weighted filter, and then the LED driver 104 is controlled to operate at an operating frequency lower than that of the liquid crystal panel 103.

This configuration can also reduce a serial transfer period to the LED driver 104 by one-half (e.g., from 120 Hz to 60 Hz), suppressing the influence of radiation caused by serial communications with the LED driver 104 in a period as short as the frame rate of an image. Since the light-emission intensity value of a light emission area is determined based on the left and right video signals, achieving local control for a high-quality 3D image unlike in local control performed based on only one of the right-eye video signal 101*a* and the left-eye video signal 101*b*.

The foregoing embodiments were illustrated as preferred exemplary embodiments and do not limit the scope of the present invention. In other words, the configurations and operations of the devices described in the foregoing embodiments are merely exemplary, and apparently, partial modification, addition, and deletion are permitted within the scope of the present invention.

The video display device according to the present embodiment can display a 3D image of high quality by local contrast control while reducing radiation caused by a circuit load or high-speed transmission. The present embodiment is also useful as a video display device, e.g., a liquid crystal display requiring a light source. Moreover, the video display device can be used as a liquid crystal display device, e.g., a liquid crystal television or a liquid crystal monitor.

What is claimed is:

1. A video display device that receives video signals from an even number of video signal lines with an identical frame period and is capable of displaying a stereoscopic image based on left-eye and right-eye images included in the video signals, comprising:
    a video display drive unit that outputs the video signals inputted from the video signal lines;
    a video display unit that has a plurality of display areas and displays the left-eye image and the right-eye image by modulating light incident from a back of the video display unit in response to the inputted video signals;
    a light-emitting device that has a plurality of light emission areas for the respective display areas and illuminates the video display unit with light from the back of the video display unit;
    a light-emitting device drive unit that drives the light-emitting device; and
    a light-emitting device control unit that determines a light-emission intensity value of the light emission area based on the left-eye image and the right-eye image, and controls and operates the light-emitting device drive unit at an operating frequency lower than an operating frequency of the video display unit,
    wherein the light-emitting device control unit comprises:
        a combination unit that generates a composite video signal by combining the video signals inputted with the identical frame period from the even number of video signal lines; and
        a local control unit that detects a video feature quantity of the composite video signal for each of the display areas and determines the light-emission intensity value of the light emission area according to the video feature quantity.

2. The video display device according to claim 1, wherein the left-eye video signal and the right-eye video signal are simultaneously inputted with an identical frame period from the even number of different signal lines, and
    the combination unit combines the left-eye video signal and the right-eye video signal and outputs the composite video signal to the local control unit.

3. The video display device according to claim 2, wherein the combination unit outputs the composite video signal to the local control unit from composite video signal output lines as many as a half of the video signal lines with a frequency identical to a frequency for inputting the left-eye video signal and the right-eye video signal.

4. The video display device according to claim 2, wherein the combination unit combines the right-eye video signal and the left-eye video signal by averaging the signals.

5. The video display device according to claim 2, wherein the combination unit compares intensity of the left-eye image and intensity of the right-eye image and output the composite signal while correcting the composite signal to or close to higher intensity.

6. The video display device according to claim 5, wherein the combination unit outputs the composite signal while correcting the composite signal to or close to higher intensity of the output signal as an intensity difference increases between the intensity of the left-eye image and the intensity of the right-eye image.

7. The video display device according to claim 6, wherein the combination unit outputs the composite video signal to the local control unit from composite video signal output lines as many as a half of the video signal lines with a frequency identical to a frequency for inputting the left-right video signal.

8. The video display device according to claim 1, wherein different left-right video signals are simultaneously inputted with an identical frame period from different signal lines, the left-right video signal containing alternately inputted left-eye and right-eye video signals, and
    the combination unit combines the different left-right video signals and alternately outputs a compressed right-eye composite image and a compressed left-eye composite image to the local control unit.

9. The video display device according to claim 8, wherein the left-eye video signal and the right-eye video signal are inputted from the different video signal lines for an odd-numbered pixel and an even-numbered pixel, and
    the combination unit selects and outputs only one of the video signal corresponding to an odd-numbered pixel and the video signal corresponding to an even-numbered pixel.

10. The video display device according to claim 1, further comprising a time-axis filter on an output stage of the local control unit.

11. The video display device according to claim 1, further comprising a memory and a light-emission intensity combination unit on an output stage of the local control unit,
    wherein the memory stores a light-emission intensity value based on temporally preceding one of the left-eye image and the right-eye image that are outputted from the combination unit, and
    the light-emission intensity combination unit compares the light-emission intensity value stored in the memory with a light-emission intensity value based on temporally subsequent one of the left-eye image and the right-eye image that are outputted from the combination unit, and outputs a composite signal while correcting the composite signal to or close to higher intensity.

12. The video display device according to claim 1, further comprising a memory and a light-emission intensity combination unit on an output stage of the local control unit,
    wherein the memory stores a light-emission intensity value based on temporally preceding one of the left-eye image and the right-eye image that are outputted from the combination unit, and
    the light-emission intensity combination unit outputs a composite signal while correcting the composite signal to or close to higher intensity according to an intensity difference between the light-emission intensity value stored in the memory and a light-emission intensity value based on temporally subsequent one of the left-eye image and the right-eye image that are outputted from the combination unit.

13. The video display device according to claim 1, wherein the combination unit generates one of a left-eye image and a right-eye image corresponding to the left-eye image by combining the video signals inputted with the identical frame period from the even number of video signal lines, and outputs the generated right-eye image and left-eye image in a temporally independent and sequential manner, and the video display device further comprises:
- a memory for storing temporally preceding one of the left-eye image and the right-eye image that are outputted from the combination unit; and
- a second combination unit that combines the image stored in the memory and temporally subsequent one of the left-eye image and the right-eye image that are outputted from the combination unit, and outputs a result of combination as a composite video signal to the local control unit.

14. The video display device according to claim 13, wherein the second combination unit compares intensity of the image stored in the memory with intensity of temporally subsequent one of the left-eye image and the right-eye image that are outputted from the combination unit, and outputs a composite signal while correcting the composite signal to or close to higher intensity.

15. The video display device according to claim 13, wherein the second combination unit outputs a composite signal while correcting the composite signal to or close to higher intensity of the output signal according to an intensity difference between intensity of the image stored in the memory and intensity of temporally subsequent one of the left-eye image and the right-eye image that are outputted from the combination unit.

16. A video display device that receives video signals from an even number of video signal lines with an identical frame period and is capable of displaying a stereoscopic image based on left-eve and right-eve images included in the video signals, comprising:
- a video display drive unit that outputs the video signals inputted from the video signal lines;
- a video display unit that has a plurality of display areas and displays the left-eye image and the right-eye image by modulating light incident from a back of the video display unit in response to the inputted video signals;
- a light-emitting device that has a plurality of light emission areas for the respective display areas and illuminates the video display unit with light from the back of the video display unit;
- a light-emitting device drive unit that drives the light-emitting device; and
- a light-emitting device control unit that determines a light-emission intensity value of the light emission area based on the left-eye image and the right-eye image, and controls and operates the light-emitting device drive unit at an operating frequency lower than an operating frequency of the video display unit, wherein the light-emitting device control unit comprises:
- a selection unit that generates a video signal by alternately selecting the video signals inputted from the even number of video signal lines and outputs the video signal from a smaller number of video signal lines than the even number of video signal lines at an operating frequency lower than the operating frequency of the video display unit, and
- a local control unit that detects a video feature quantity of the video signal from the selection unit and determines the light-emission intensity value of the light emission area according to the video feature quantity.

17. A video display device that receives video signals from an even number of video signal lines with an identical frame period and is capable of displaying a stereoscopic image based on left-eye and right-eye images included in the video signals, comprising:
- a video display drive unit that outputs the video signals inputted from the video signal lines;
- a video display unit that has a plurality of display areas and displays the left-eye image and the right-eye image by modulating light incident from a back of the video display unit in response to the inputted video signals;
- a light-emitting device that has a plurality of light emission areas for the respective display areas and illuminates the video display unit with light from the back of the video display unit;
- a light-emitting device drive unit that drives the light-emitting device; and
- a light-emitting device control unit that determines a light-emission intensity value of the light emission area based on the left-eve image and the right-eye image, and controls and operates the light-emitting device drive unit at an operating frequency lower than an operating frequency of the video display unit, wherein the light-emitting device control unit comprises:
- a plurality of local control units, each of which detects a video feature quantity of the video signal from the video signal of the video signal line, determines the light-emission intensity value of the light emission area according to the video feature quantity, and outputs the light-emission intensity value; and
- one of a combination unit and a selection unit that output a signal to the light-emission device drive unit based on the signals from the plurality of local control units at an operating frequency lower than the operating frequency of the video display unit.

* * * * *